United States Patent [19]

Parera

[11] 3,769,664
[45] Nov. 6, 1973

[54] SAFETY FASTENER MEANS
[76] Inventor: Pedro Pere Parera, Alba St., No. 3, Barcelona, Spain
[22] Filed: June 14, 1971
[21] Appl. No.: 152,910

[30] Foreign Application Priority Data
June 16, 1970 Spain .................................. 380812
Jan. 14, 1971 Spain .................................. 387240

[52] U.S. Cl. ............................................... 24/217
[51] Int. Cl. ............................................ A44b 17/00
[58] Field of Search ..................................... 24/117

[56] References Cited
UNITED STATES PATENTS
| 2,585,897 | 2/1952 | Johnson | 24/217 |
| 3,454,993 | 7/1969 | Jacobson | 24/217 |
| 503,081 | 8/1893 | Hall | 24/217 |
| 1,096,897 | 5/1914 | Fisher | 24/217 |
| 2,624,090 | 1/1953 | Jones | 24/217 |
| 3,538,557 | 11/1970 | Hirose | 24/217 |

Primary Examiner—Paul R. Gilliam
Attorney—Woodhams, Blanchard & Flynn

[57] ABSTRACT

A safety fastener for joining two laminae, comprising a male element having two pieces fixed together for holding one of the laminae therebetween and a female element releasably connectible to the male element. The female element is formed as an inverted cup with its base arched and susceptible to pass from concave to convex and provided with projecting teeth adapted to engage an annular slot in the male element. The female element is confined with free-play between an exterior tubular piece and an intermediate tubular piece. A concave disc is supported adjacent the base of the female element, whereby the fastener is opened by finger pressure exercised on the convexity of the female element. A ring is provided for fixing the female element to the other laminae.

3 Claims, 5 Drawing Figures

PATENTED NOV 6 1973

Inventor
PEDRO PERE PARERA

By Woodhams, Blanchard & Flynn
Attorneys

PATENTED NOV 6 1973 3,769,664

Inventor
PEDRO PERE PARERA

Woodhams Blanchard and Flynn
Attorneys

3,769,664

SAFETY FASTENER MEANS

This invention refers to improvements in safety fastener means for joining two laminae preferably flexible such as canvases, skins, plates or sheets and the like at their borders and in such a manner that they cannot be opened by pulling these laminae nor trying to open them by their borders by doubling or folding them, seeing that to do so it is simply necessary to "pulsate" (press) the central part of the closure.

Fasteners are known that present unfortunate realization means in a poorly technical manner and without taking into account a highly primordial detail, which is that the convexity of the closure piece ought never under any circumstances project from or surpass the tubular border of the exterior piece, seeing that this causes the involuntary opening of the fastener due to a chance contact that presses the protruding convexity. On the other hand, the sectional form of the casing or exterior tubular piece is not only inadequate but also of exceedingly difficult mechanical execution, owing to the T formation of its transverse section, with in addition an inferior entrance wing or flap, which results in unnecessary elevated cost as also in an undesirable mechanical realization.

On the contrary, the object of this invention consists of the realization of a snap-type closure means incorporating a flexible disc, prolonged with fixing legs or feet bent at 90° to the periphery of the disc, constituting the closing element that offers no technical inconveniences nor in cost nor in defective operation as experienced by this class of closures as known up to the present time. All the elements comprising these improved fasteners are produced by drop forging or stamping. In some of the alternatives to the foreseen realizations, auxiliary concave discs have been provided that cannot be actuated by chance from exterior accidental rubbing.

In the drawing:

FIG. 5 shows a third alternative of the safety fastener according to the invention in an exterior exploded sectional side view.

Referring to the figures, 1 is seen to represent the piece that is coupled and fixed to the male piece 2 by plugging in and later riveting, which in addition to consolidate the two parts, consolidates between them one of the flexible laminae. This conjoint assembly fixed to one of the laminae to be joined, constitutes the male of the fastener, which is identical in all of the disclosed embodiments.

Figure 1:
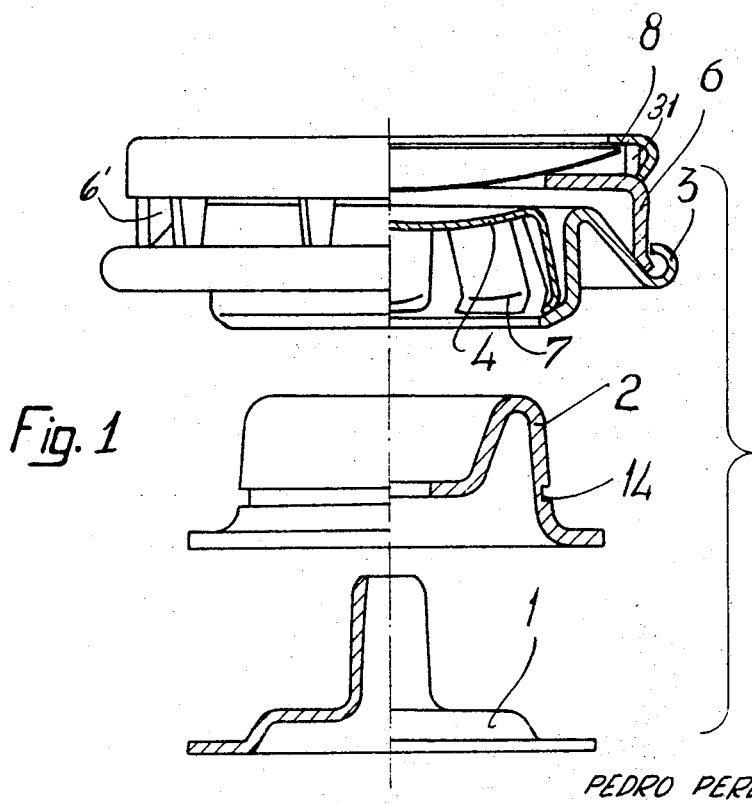
FIG. 1 is a partial exploded view of a safety fastener taken partially in cross section.

The female assembly of the embodiment shown in FIG. 1, essentially comprises the female piece 4 itself in the form of inverted cup with its base arched that can change from concave to convex, from closed to open respectively, and which has lateral appendages 7 bent at 90° to the arched base, terminating in teeth bent at 90° inwardly, constituting the hooking teeth, and which female piece is imprisoned with some free play between the annular disk 6 and an interior lip or shoulder of the tubular piece 3. The annular disc 6 has teeth 6 stamped at its periphery, bent over to 90°, that perforate the flexible lamina and that join in the circular doubling extremity of the support 3, and which disc 6 presents wings or flaps 31 between the above mentioned teeth bent over also to 90° but in opposite direction to that of the teeth. Wings 31 function as lateral stops for the concave disc 8 which is the opener of the fastener. Wings 31 also serve as supports for the upper ring 8, of L form in cross section. The flexible lamina passes between the disc 6 and above the female piece 4.

During the functioning of the fastener, the end teeth of the female piece 4 hook in the annular throat 14 of the male piece 2, upon being compressed the convexity of the female base by the upper extremity of the male piece 2, by which the joining of both parts is effected or unions of the closing device.

Figure 2:
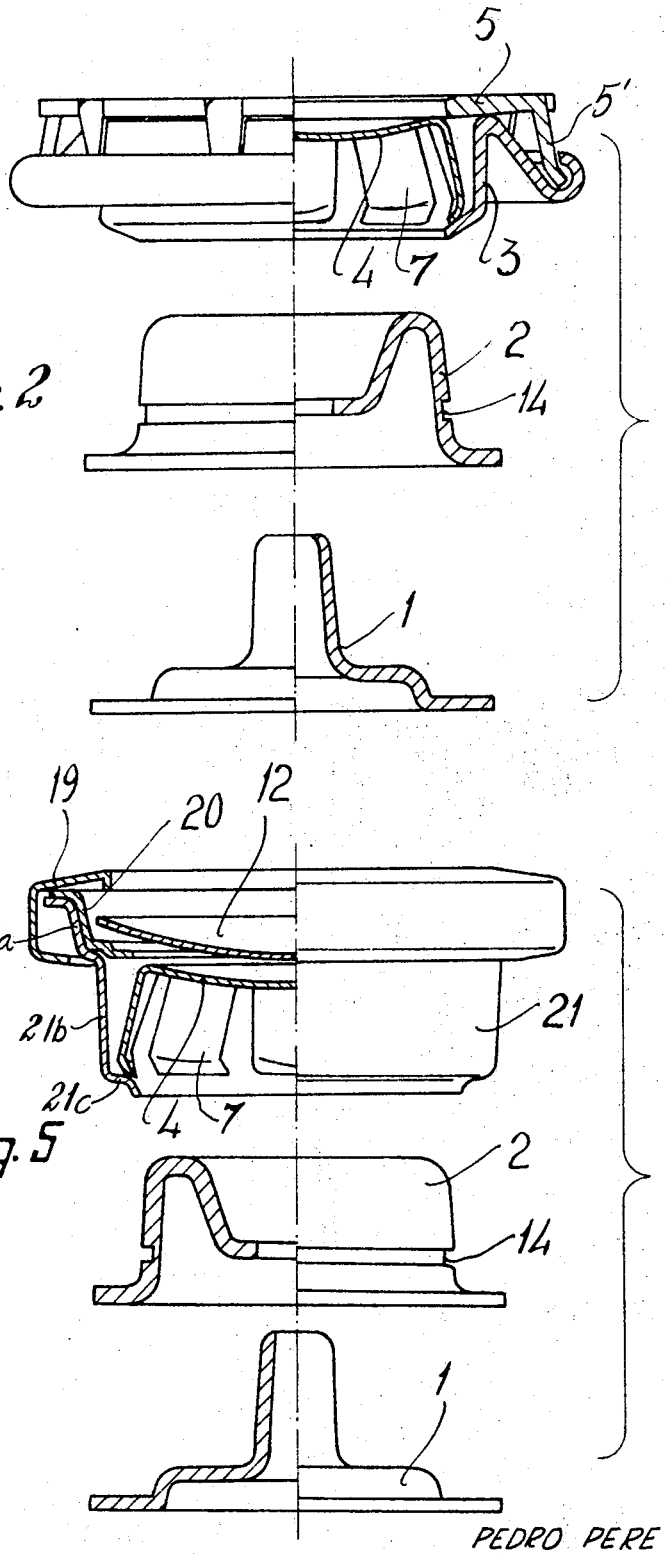
FIG. 2 shows an alternative to the safety fastener according to the invention in a sectional exploded side view.

The embodiment shown in FIG. 2 comprises as the female assembly, an annular disc 5 with stamped teeth 51 at its periphery bent over to 90° to perforate the flexible lamina, imbedding itself in the outer circular doubling of the support 3, which encases the female piece 4, the annular disc 5 being the only external piece to the exterior face of the lamina, carrier of the female part of the fastener. The lamina thus passes between the annular disk 5 and the upper surface of the piece 4.

Figure 3:
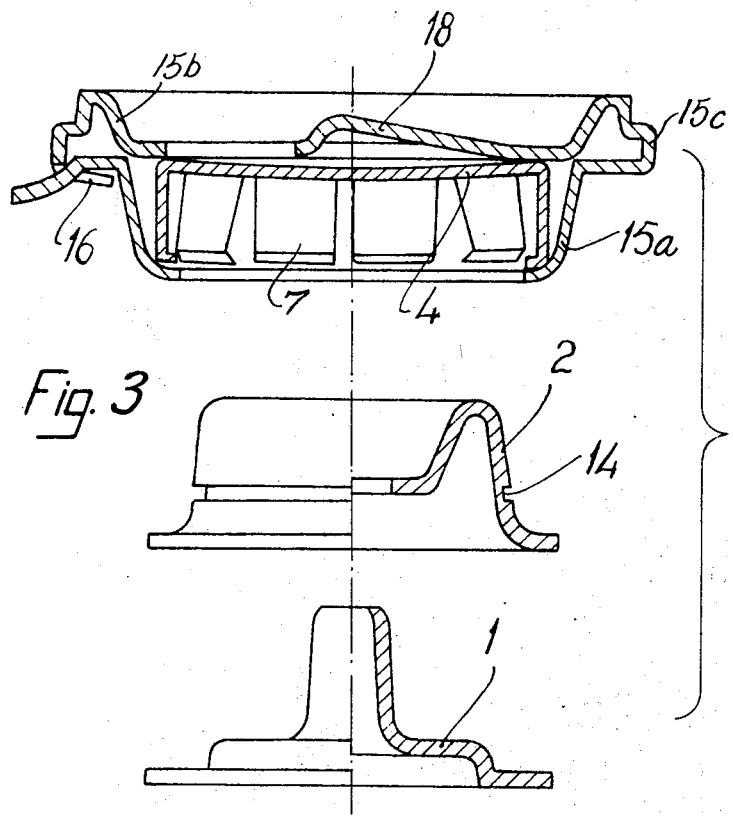
FIG. 3 shows a second alternative according to the invention of the safety fastener in a sectional exploded side view.
Figure 4:
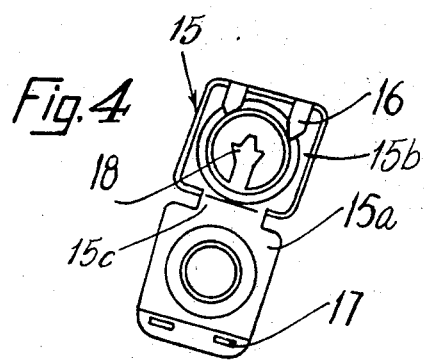
FIG. 4 shows the female piece of FIG. 3 unfolded unrolled.

The embodiments shown in FIGS. 3 and 4 comprise as female assembly a rectangular form die-stamped and punched metallic female assembly 15, comprising two square portions 15a and 15b separated by a less wider piece 15c which permits the doubling and superposition of portions 15a and 15b as indicated in the section of FIG. 3. Hooking protrusions 16 are formed on the portion 15b penetrate the flexible lamina and extend through two rectangular openings 17, formed in the opposite border of the lower square portion 15a. A projection 18 integral with portion indicates the center of the upper square portion 15b corresponding to the center of the base of the female piece 4 that must be pressed in order to open the safety fastener. The lamina is thus positioned between the portions 15a and 15b, being specifically positioned between the projection 18 and the upper surface of the female piece 4.

The embodiment shown in FIG. 5 comprises as female assembly an exterior tubular piece 19, an interior ring 20 that presents two annular flanges over whose smaller border an exterior concave disc 12 is freely supported, which is the one that receives the "pulsation" (pressure), in order to press the upper convexity of the female piece 4 and thus open the fastener; a tubular piece 21 whose upper enlarged portion 21a is housed in the interior of the exterior piece 19, whilst its slightly conical cup 21b remains free below the flexible lamina and is provided with an inwardly projecting lower annular flange 21c which forms the interior support port for the female piece 4.

The exterior tubular piece 21 constitutes the upper part and is disposed above the flexible lamina, whilst the inferior visible part of the tubular piece 21 namely the cup portion 21b constitutes the lower part of the female element and is disposed beneath the flexible lamina.

The flexible lamina makes its entrance by the interior border of the upper tubular piece 19 and is interposed between the contact surfaces of the inner ring 20, and of the enlarged tubular part on 21a with the lamina then passing between the disc 12 and the upper surface of the piece 4.

Four embodiments are given in the five figures, all as examples and all using the same male assembly comprising the riveted assembly 1–2 which presents the interposed flexible lamina. The same female element 4 has been used with the precaution that the high point of the convexity of the superior arched base is below the uppermost or outermost border of the female element 4, in order to prevent chance opening of the safety fastener due to unintentional rubbing.

In two of the alternatives of the realization, a disc 12 has been included that presents a concavity in its "pulsation" (pressure) face confronted with the female piece 4, precisely with the base of same, with which arrangement chance cases of opening the safety fastener are securely prevented.

The snap fastener according to the present invention, as illustrated on the attached drawings, is highly desirable since the flexible lamina which is secured to the female assembly can be attached to the female assembly without requiring that a preformed hole or aperture be formed therein. Rather, the lamina is fixedly secured to the components of the female assembly merely by being clampingly engaged between the respective components, such as by being penetrated by the teeth 6', 5' or 16. Thus, the flexible lamina is positioned between the cover member and the female part 4, with the flexible lamina extending completely over the annular base portion of the female part 4. This thus greatly facilitates the mounting of the female assembly on the lamina by totally eliminating the necessity of having to preform a hole in the lamina.

I claim:

1. In a snap-type fastener assembly for interconnecting two flexible sheetlike elements, said fastener assembly including a female subassembly fixedly connected to one of said sheetlike elements and a male subassembly fixedly connected to the other sheetlike element, the male subassembly being releasably connectible to the female assembly, comprising the improvement wherein said female subassembly is connectible to said one sheetlike member without requiring that a preformed aperture be provided therein, said female subassembly including:

cover means positionable adjacent one surface of said one sheetlike element, said cover means including a ringlike cover member having a central opening therethrough;

said cover means including a ringlike member disposed between said cover member and said one surface of said one sheetlike member, said ringlike member having a central aperture therethrough in substantial alignment with the opening formed in said cover member;

clamping means positionable adjacent the other surface of said one sheetlike element and releasably engageable with said male subassembly, said clamping means including a resilient cup-shaped snap type clamping member and an annular casing surrounding said clamping member;

said clamping member including an arched platelike base positioned directly adjacent said other surface of said one sheetlike member and capable of passing between a convex and a concave configuration, and a plurality of legs fixedly secured to the edge of said base and extending transversely outwardly therefrom in a direction away from said other surface, said legs having inwardly extending hooks on the free ends thereof which are adapted to extend into an annular groove formed on said male subassembly;

said cover means also including a disc disposed between said cover member and said ringlike member and resting freely on the inner edge of said ringlike member, whereby said disc extends across said aperture and is disposed directly opposite the base of said clamping member with said one sheetlike member being interposed therebetween; and holding means coacting between said cover means and said annular casing for engaging said one sheetlike member for fixedly connecting same to said female subassembly while permitting said one sheetlike member to be positioned between said cover member and said base of said clamping member, whereby it is unnecessary to provide a preformed aperture in said one sheetlike member for reception of said female subassembly;

said holding means including a plurality of pointed teeth positioned for penetration of said one sheetlike member, said pointed teeth being disposed in a circular pattern surrounding said clamping member and extending between said annular casing and said ringlike member for fixedly connecting said casing and said ringlike member together while maintaining said casing and said ringlike member positioned on opposite sides of said one sheetlike member, said teeth being fixed to one of said casing and ringlike member, the free ends of said teeth being engaged with the other of said casing and ringlike member, one of said casing and cover means externally surrounding and covering the free ends of said teeth.

2. A fastener assembly according to claim 1, wherein said teeth are fixedly connected to said ringlike member and project toward said clamping member in surrounding relationship thereto.

3. A fastener assembly according to claim 1, wherein said teeth are fixedly secured to said ringlike member, and wherein said ringlike member includes a second set of teeth projecting outwardly therefrom in a direction opposite said first-mentioned teeth and fixedly connecting said ringlike member and said cover member.

* * * * *